US008815965B2

(12) United States Patent
Cole et al.

(10) Patent No.: US 8,815,965 B2
(45) Date of Patent: Aug. 26, 2014

(54) PROCESSES FOR RECOVERING RUBBER FROM NATURAL RUBBER LATEX

(75) Inventors: William M Cole, Clinton, OH (US); Georg G. A. Bohm, Akron, OH (US); Walter Tomaszewski, Canton, OH (US); Yingyi Huang, Sagamore Hills, OH (US)

(73) Assignee: Bridgestone Corporation, Tokyo (JP)

( * ) Notice: Subject to any disclaimer, the term of this patent is extended or adjusted under 35 U.S.C. 154(b) by 87 days.

(21) Appl. No.: 12/937,284

(22) PCT Filed: Apr. 14, 2009

(86) PCT No.: PCT/US2009/040543
§ 371 (c)(1),
(2), (4) Date: Nov. 11, 2010

(87) PCT Pub. No.: WO2009/129249
PCT Pub. Date: Oct. 22, 2009

(65) Prior Publication Data
US 2011/0054051 A1 Mar. 3, 2011

Related U.S. Application Data

(60) Provisional application No. 61/044,649, filed on Apr. 14, 2008.

(51) Int. Cl.
*C08J 11/04* (2006.01)
(52) U.S. Cl.
USPC .......... 521/44.5; 528/931; 528/933; 528/934; 528/937; 528/491; 528/493; 528/495; 524/575.5; 524/925
(58) Field of Classification Search
USPC ............. 528/480, 491, 493, 495, 499, 502 R, 528/502 A, 503, 931, 932–937; 524/575.5, 524/925, 926
See application file for complete search history.

(56) References Cited

U.S. PATENT DOCUMENTS

| 741,258 A | 10/1903 | Lawrence |
|---|---|---|
| 814,407 A | 3/1906 | Von Stechow |
| 843,567 A | 2/1907 | Bradshaw |
| 957,495 A | 5/1910 | Chute et al. |
| 979,902 A | 9/1910 | Van der Linde |
| 999,493 A | 8/1911 | Ellis |
| 999,708 A | 8/1911 | Ellis |
| 1,003,139 A | 9/1911 | Kelley |
| 1,007,681 A | 11/1911 | Ellis |
| 1,051,987 A | 2/1913 | Chute |
| 1,103,903 A | 7/1914 | Kendall |
| 1,105,568 A | 7/1914 | Kendall |
| 1,135,236 A | 4/1915 | Wheeler et al. |
| 1,161,135 A | 11/1915 | Kaminski et al. |
| 1,167,264 A | 1/1916 | Brooks |
| 1,189,549 A | 7/1916 | Ellis |
| 1,189,550 A | 7/1916 | Ellis |
| 1,242,886 A | 10/1917 | Meyer |
| 1,247,814 A | 11/1917 | Garza |
| 1,550,319 A | 8/1925 | Hopkinson |
| 1,671,570 A | 5/1928 | Carnahan |
| 1,695,676 A | 12/1928 | Yeandle |
| 1,735,835 A | 11/1929 | Kohno |
| 1,740,079 A | 12/1929 | Edison |
| 1,753,184 A | 4/1930 | Spence |
| 1,753,185 A | 4/1930 | Spence |
| 1,829,502 A | 10/1931 | Calcott et al. |
| 1,833,287 A | 11/1931 | Hadley |
| 1,903,500 A | 4/1933 | Calcott |
| 2,138,895 A | 12/1938 | Wiezevich |
| 2,187,146 A | 1/1940 | Calcott et al. |
| 2,281,336 A | 4/1942 | Stacom |
| 2,364,394 A | 12/1944 | Sibley |
| 2,373,689 A | 4/1945 | Kenda |
| 2,387,521 A | 10/1945 | Martin |
| 2,390,860 A | 12/1945 | Williams |
| 2,399,156 A | 4/1946 | Stamberger et al. |
| 2,408,853 A | 10/1946 | Hoover et al. |
| 2,410,780 A | 11/1946 | Gracia |
| 2,410,781 A | 11/1946 | Gracia |
| 2,425,011 A | 8/1947 | Smith |
| 2,434,412 A | 1/1948 | Jones |
| 2,459,369 A | 1/1949 | Tint et al. |
| 2,475,141 A | 7/1949 | Jones |
| 2,522,136 A | 9/1950 | Schaffer |
| 2,549,763 A | 4/1951 | Banigan, Jr. et al. |
| 2,572,046 A | 10/1951 | Meeks et al. |
| 2,618,670 A | 11/1952 | Clark |
| 2,665,317 A | 1/1954 | Clark et al. |
| 2,744,125 A | 5/1956 | Meeks et al. |
| 3,311,601 A | 3/1967 | Conley |
| 3,376,158 A | 4/1968 | Buser |
| 4,122,012 A | 10/1978 | Vlasnik |
| 4,136,131 A | 1/1979 | Buchanan |
| 4,159,903 A | 7/1979 | Bauman |

(Continued)

FOREIGN PATENT DOCUMENTS

EP 87109 8/1983
EP 100434 2/1984

(Continued)

OTHER PUBLICATIONS

Extended Search Report, EP 09733501, Aug. 19, 2011.
Abstract—Week 200365 Thomson Scientific, London, GB; AN 2003-682828; XP000002567182, JP 2003 040902 A (Nitto Denko Corp) Feb. 13, 2003.
ASTM International, Standard Test Methods for Rubber from Natural Sources-Chemical Analysis, D 1278, 2002, pp. 246-251.
Curtis, Jr., "Distribution of Rubber and Resins in Guayule," Plant Phusiology, vol. 22, No. 4, Oct. 1947, pp. 333-359.

(Continued)

*Primary Examiner* — Frances Tischler
(74) *Attorney, Agent, or Firm* — Meredith E. Hooker; Jenny L. Sheaffer

(57) ABSTRACT

Processes for recovering natural rubber from an aqueous natural rubber latex that contains extractables and one or more additives and that is essentially free of lignocellulosic plant material are described. Natural rubber in the latex is separated from the water. Preferably, the amount of non-rubber extractables in the natural rubber is reduced by one or more extraction steps yielding a dried natural rubber.

19 Claims, No Drawings

(56) References Cited

U.S. PATENT DOCUMENTS

| | | |
|---|---|---|
| 4,198,324 A | 4/1980 | Lal et al. |
| 4,243,561 A | 1/1981 | Lal et al. |
| 4,246,001 A | 1/1981 | Bauman |
| 4,272,436 A | 6/1981 | Lal et al. |
| 4,363,188 A | 12/1982 | Dastoor et al. |
| 4,376,189 A | 3/1983 | Trivette |
| 4,376,835 A | 3/1983 | Schmitt et al. |
| 4,376,853 A | 3/1983 | Gutierrez et al. |
| 4,405,532 A | 9/1983 | Gutierrez et al. |
| 4,410,656 A | 10/1983 | Coran et al. |
| 4,412,031 A | 10/1983 | Kitahara et al. |
| 4,412,041 A | 10/1983 | Kitahura et al. |
| 4,424,171 A | 1/1984 | Gutierrez et al. |
| 4,433,114 A | 2/1984 | Coran et al. |
| 4,434,266 A | 2/1984 | Trivette, Jr. |
| 4,435,337 A | 3/1984 | Kay et al. |
| 4,493,925 A | 1/1985 | Trivette, Jr. |
| 4,496,683 A | 1/1985 | Morita |
| 4,499,243 A | 2/1985 | Rader |
| 4,513,110 A | 4/1985 | Rader |
| 4,525,541 A | 6/1985 | Kitahara et al. |
| 4,526,959 A | 7/1985 | Kay et al. |
| 4,530,995 A | 7/1985 | Gutierrez et al. |
| 4,542,191 A | 9/1985 | Kay et al. |
| 4,557,306 A | 12/1985 | Graves |
| 4,559,378 A | 12/1985 | Kay et al. |
| 4,568,711 A | 2/1986 | Kay et al. |
| 4,570,690 A | 2/1986 | Graves |
| 4,585,826 A | 4/1986 | Graves |
| 4,591,631 A | 5/1986 | Beattie et al. |
| 4,591,632 A | 5/1986 | Moore |
| 4,609,336 A | 9/1986 | Stevenson et al. |
| 4,616,068 A | 10/1986 | Schloman, Jr. et al. |
| 4,616,075 A | 10/1986 | Malani et al. |
| 4,621,118 A | 11/1986 | Schloman, Jr. et al. |
| 4,622,365 A | 11/1986 | Scholman, Jr. et al. |
| 4,623,713 A | 11/1986 | Beinor et al. |
| 4,638,028 A | 1/1987 | Lui et al. |
| 4,647,607 A | 3/1987 | Kay et al. |
| 4,677,153 A | 6/1987 | Kitahara et al. |
| 4,678,860 A | 7/1987 | Kuester |
| 4,681,929 A | 7/1987 | Cole et al. |
| 4,684,715 A | 8/1987 | Kay et al. |
| 4,687,810 A | 8/1987 | Coran |
| 4,728,343 A | 3/1988 | Snyder |
| 4,739,037 A | 4/1988 | Kay et al. |
| 4,739,038 A | 4/1988 | Schloman, Jr. |
| 4,751,271 A | 6/1988 | Graves |
| 4,761,446 A | 8/1988 | Graves et al. |
| 4,762,870 A | 8/1988 | Graves et al. |
| 4,778,857 A | 10/1988 | Graves et al. |
| 4,786,683 A | 11/1988 | Schloman, Jr. et al. |
| 4,792,583 A | 12/1988 | Coran |
| 4,804,741 A | 2/1989 | Verbiscar et al. |
| 4,822,845 A | 4/1989 | Graves et al. |
| 4,829,117 A | 5/1989 | Schloman, Jr. et al. |
| 4,927,887 A | 5/1990 | Tate |
| 4,975,497 A | 12/1990 | Tate et al. |
| 4,983,729 A | 1/1991 | Sikora |
| 4,988,388 A | 1/1991 | Schloman, Jr. |
| 5,247,009 A | 9/1993 | Kitahara |
| 5,272,203 A | 12/1993 | Joyner |
| 5,306,862 A | 4/1994 | Chappell et al. |
| 5,321,111 A | 6/1994 | Ji |
| 5,362,807 A | 11/1994 | Nogura et al. |
| 5,473,024 A | 12/1995 | Thames et al. |
| 5,580,942 A | 12/1996 | Cornish |
| 5,633,433 A | 5/1997 | Backhaus et al. |
| 5,717,050 A | 2/1998 | Cornish |
| 5,872,186 A | 2/1999 | Ang |
| 5,998,512 A | 12/1999 | Schloman |
| 6,014,998 A | 1/2000 | Mowdood |
| 6,054,525 A | 4/2000 | Schloman, Jr. et al. |
| 6,132,711 A | 10/2000 | Backhaus et al. |
| 6,399,673 B1 | 6/2002 | Thames et al. |
| 6,482,884 B1 | 11/2002 | Schaal |
| 6,645,747 B1 | 11/2003 | Hallahan et al. |
| 6,734,245 B2 | 5/2004 | Baranek |
| 6,787,590 B2 | 9/2004 | Nakayama et al. |
| 6,818,676 B2 | 11/2004 | Koffler et al. |
| 7,026,678 B2 | 4/2006 | Coursey |
| 7,205,456 B2 | 4/2007 | Hallahan et al. |
| 7,259,231 B2 | 8/2007 | Cornish et al. |
| 7,540,438 B2 | 6/2009 | Buranov |
| 7,629,397 B2 | 12/2009 | McDonald et al. |
| 7,790,036 B2 | 9/2010 | Cornish et al. |
| 7,923,039 B2 | 4/2011 | Cornish et al. |
| 7,955,611 B2 | 6/2011 | Brown et al. |
| 8,013,213 B2 | 9/2011 | Mau et al. |
| 2004/0265343 A1 | 12/2004 | Hill |
| 2006/0070167 A1 | 4/2006 | Eng et al. |
| 2006/0106183 A1 | 5/2006 | Cornish et al. |
| 2006/0149015 A1 | 7/2006 | Cornish et al. |
| 2006/0217512 A1 | 9/2006 | Mau et al. |
| 2006/0218660 A1 | 9/2006 | Dong et al. |
| 2007/0265408 A1 | 11/2007 | Cornish et al. |
| 2007/0276112 A1 | 11/2007 | Buranov |
| 2008/0015336 A1 | 1/2008 | Cornish et al. |
| 2008/0172998 A1 | 7/2008 | Fraley et al. |
| 2008/0221246 A1 | 9/2008 | Imam et al. |
| 2008/0300526 A1 | 12/2008 | Gumbs |
| 2009/0054595 A1 | 2/2009 | Cornish et al. |
| 2009/0099309 A1 | 4/2009 | Gumbs |
| 2009/0099327 A1 | 4/2009 | Cornish et al. |
| 2009/0163689 A1 | 6/2009 | Cornish et al. |
| 2009/0191243 A9 | 7/2009 | Hill et al. |
| 2011/0021743 A1 | 1/2011 | Cornish et al. |
| 2011/0054051 A1 | 3/2011 | Cole et al. |

FOREIGN PATENT DOCUMENTS

| | | |
|---|---|---|
| EP | 105822 | 4/1984 |
| EP | 179211 | 4/1986 |
| EP | 180716 | 5/1986 |
| EP | 476641 | 3/1992 |
| EP | 491229 | 6/1992 |
| EP | 0509768 | 10/1992 |
| EP | 938350 | 9/1999 |
| EP | 1752277 | 2/2007 |
| EP | 2183303 A0 | 2/2009 |
| EP | 675202 | 10/2009 |
| EP | 1969036 | 3/2011 |
| GB | 2 164 341 A | 3/1986 |
| GB | 2 174 403 A | 11/1986 |
| JP | S61-264005 A | 11/1986 |
| JP | 62000502 | 1/1987 |
| JP | H06100704 | 4/1994 |
| JP | H08283309 | 10/1996 |
| JP | 11-012306 | 1/1999 |
| JP | 11012306 A | 1/1999 |
| JP | 2003040902 A | 2/2003 |
| JP | 2003-313366 | 11/2003 |
| JP | 2006348067 | 12/2006 |
| JP | 2007-126676 | 5/2007 |
| JP | 2007224067 | 9/2007 |
| WO | 8103255 | 11/1981 |
| WO | 0110946 | 2/2001 |
| WO | 0149257 | 7/2001 |
| WO | 2009129249 | 10/2009 |

OTHER PUBLICATIONS

Doering, "Guayule Rubber in Tires and Tubes, Service Tests in Which the Rubber was Exclusively Guayule," Industrial and Engineering Chemistry, vol. 26, No. 5, pp. 541-543, May 1934.
EP 09733501 Communication Pursuant to Article 94(3) EPC, May 10, 2012.
Makitra, et al., "Dependence of Natural Rubber Swelling Index Upon Orgranic Solvents Properties," Chemistry & Chemical Technology, vol. 5, No. 1, 2011, pp. 19-24.
McIntyre, et al., "Guayule Rubber," Handbook of Elastomers, pp. 1-27, 2001.
EP1752277A2—Feb. 14, 2007—English Machine Translation.
JP62000502—Machine Translated English Abstract.

(56) References Cited

OTHER PUBLICATIONS

Freeze Coagulation of ABS Latex, R. J. Adler et al., Ind. Eng. Chem. Res. 1997, 36, 2156-2162.
Effect of Resin Components on the Degradation of Guayule rubber, Journal of Applied Polymer Science, vol. 30, 2367-2388 (1985).
Guayule Rubber: A New Possible World Scenario for the Production of Natural Rubber Progress in Rubber and Plastics Technology, vol. 16, No. 1, 2000.
Structural Characterization of Natural Polyisoprenes: Solve the Mystery of NaturalRubber Based on Structural Study Rubber Chemistry and Technology vol. 74, 355, 2001.
International Preliminary Report on Patentability and Written Opinion (corresponding PCT Application No. PCT/US2009/040543); Authorized Officer Athina Nickitas-Etienne; Oct. 19, 2010. (8 pages).
International Search Report (corresponding PCT Application No. PCT/US2009/040543); Authorized Officer Kang, Hyunk Seok; Nov. 9, 2009. (2 pages).
First Office Action in Chinese Application No. 200980122454 dated Mar. 27, 2012.
Second Office Action in Chinese Application No. 200980122454 dated Jun. 27, 2012.
Schloman, W. W.. Jr., et al., Guayule Byproduct Evaluation: Extract Characterization, J. Agricultural and Food Chemistry, vol. 31, pp. 873-876 (1983).
T.R. Meeker; Specialty Isoprene Based Polymers—Derivatives From the General Purpose Polymers; Doc.1848; Spring 1985.
Kuester, J.L, C.M. Fernandez, T.C. Wang, and G. Heath. Liquid Hydrocarbon Fuel Potential of Agricultural Materials. In R.P. Overend, T.A. Milne, and L.K. Mudge, eds., International Conference on Fundamentals of Thermochemical Biomass Conversion, 1982, Estes Park Colo., Elsevier Applied Science: London, pp. 875-895 (1985).
Response to European Office Action dated Sep. 20, 2012.
Jacques van Rysselberge, Utilisation De Bitumes Elastomeres (1976). pp. 66-74.
International Products Brochure 2007.
Australian Patent Exam Report for 2009236328 dated Jul. 2, 2013.
Japanese Office Action for 2011-505140 dated Jan. 7, 2014.
Second Australian Patent Exam Report 2009236328 dated Jan. 30, 2014.
Belmares, H. et al. New Rubber Peptizers and Coatings Derived from Guayule Resin, Industrial and Engineering Chemistry: Product Research and Development, vol. 19, pp. 107-111 (1980).
Kuester, J.L., Liquid Hydrocarbon Fuels From Biomass (1981), pp. 163-184.
Schloman, W. W. Jr., et al., Guayule Byproduct Evaluation: Extract Characterization, J. Agricultural and Food Chemistry, vol. 31, pp. 873-876 (1983).
Schloman, W. W. Jr. et al., Rubber Additives Derived from Guayule Resin, Industrial and Eng'r Chem. Research, vol. 27, pp. 712-716 (1988).
Schloman, W. W. Jr., et al., Water Stress and Seasonal Effects on Rubber Quality in Irrigated Guayule, J. Agricultural and Food Chemistry v. 34, pp. 683-685 (1986).
Schloman, W. W. Jr. et al., Seasonal Effects on Guayule Resin Composition, J. Agricultural and Food Chemistry, v. 34, pp. 177-179 (1986).
T.R. Meeker; Specialty Isoprene Based Polymers—Derivatives From the General Purpose Polymers; Doc. 1848; Spring 1985.
Rubber Developments vol. 39 No. 1, pp. 23-24; Your Questions Answered (1986).
J. Brad Murphy and C.A. Stutte; Analytical Biochemistry 86, 220-228 (1978); Analysis for Substituted Benzoic and Cinnamic Acids Using High-Pressure Liquid Chromatography.
Himayah H. Naqvi and George P. Hanson; American Journal of Botany, vol. 69, No. 6 (Jul. 1982) pp. 985-989; Germination and Growth Inhibitors in Guayule (Parthenium argentatum Gray) Chaff and Their Possible Inflluence in Seed Dormancy.
Subramaniam, A., J. Rubb. Res. Inst. Malaysia 25(2), 61-68; Estimation of Aldehyde Groups in Natural Rubber with 2, 4-dinitrophenylhydrazine (1977).
G.F. Touzinsky; Northern Regional Research Center; Agricultural Research, Science and Education Administration; Guayule As a Source of Papermaking Fiber, 5th International Dissolving Pulps Conference, Vienna, pp. 311-315 (1980).
Benedict, H.M. The Effect of Waste Products From the Guayule Rubber Mill on the Growth of Various Crops. Journal of the American Society of Agronomy, vol. 40: pp. 1005-1016 (1948).
Bonner, J., and A.W. Galston. Toxic Substances From the Culture Media of Guayule Which May Inhibit Growth. Botanical Gazette, vol. 106; pp. 189-198 (1944).
Chang, M., and G.T. Tsao. Hydrolysis of Guayule Cellulose for Alcohol Production. E.C. Gregg, J.L. Tipton and H.T. Huang, eds., Proceedings of the Third International Guayule Conference, Pasadena, Calif., Guayule Rubber Soc.: Riverside, Calif., pp. 211-224 (1983).
Gelling, I.R. Modification of Nautral Rubber Latex With Peracetic Acid. Rubber Chemistry and Technology. vol. 58, pp. 86-96. (1985).
Keller, R.W., D.S. Winkler, and H.L. Stephens. Degradative Effects of Guayule Resin on Natural Rubber. Rubber Chemistry and Technology. vol. 54, pp. 115-123, (1981).
King, R.J., and D. M. Mondimore. HPLC Procedure for the determination of Free Sulfur in Natural Rubber Formulations. Rubber Chemistry and Technology. vol. 60, pp. 716-720 (1987).
Kuester, J.L., C.M. Fernandez, T.C. Wang, and G. Heath. Liquid Hydrocarbon Fuel Potential of Agricultural Materials. In R.P. Overend, T.A. Milne, and L.K. Mudge, eds., International Conference on Fundamentals of Thermochemical Biomass Conversion, 1982, Estes Park Colo., Elsevier Applied Science: London, pp. 875-895 (1985).
Response to the Extended European Search Report dated Mar. 8, 2012.
Response to European Office Action dated Sep., 20, 2012.
Communication pursuant to Article 94(3) EPC dated Jan. 15, 2013.
Invitation pursuant to Article 94(3) and Rule 71(1) EPC dated Feb. 13, 2013.
Response to EPO dated Apr. 9, 2013.
Notification of Intent to Grant from European Patent Office dated Jun. 12, 2013.
Sin Siew Weng, Some Traditional and New Uses of Skim Rubber, Rubber Research Institute of Malaysia, Proceedings of RRIM Planters Conference (1981.), pp. 335-363.
Jacques van Rysselberge, Utilisation de Bitumes Elastomeres (1976), pp. 66-74.
Response to Australian Office Action, Dec. 23, 2013.

PROCESSES FOR RECOVERING RUBBER FROM NATURAL RUBBER LATEX

PRIORITY

This application claims priority to U.S. provisional application Ser. No. 61/044,649, filed Apr. 14, 2008.

FIELD

The present application relates to processes for the recovery of natural rubber from natural rubber latex, and particularly from natural rubber latex containing water, extractables, and one or more additives, and that is essentially free of lignocellulosic plant material.

BACKGROUND

Natural rubber may be obtained from a number of plants, including *Hevea* trees (*Hevea brasiliensis*) and Guayule shrubs (*Parthenium argentatum*), among others. Processes for recovering or harvesting natural rubber from these sources are known in the art. For example, *Hevea* trees are usually tapped such that the *Hevea* sap (containing natural rubber) is harvested and contacted with an organic acid to coagulate the natural rubber, and thereafter concentrated by evaporation or centrifugation. Alternatively, Guayule shrubs are usually ground up or otherwise masticated to release sap (containing natural rubber) from the cell walls of the shrub, and the pulp thereafter contacted with solvent or aqueous acids in order to coagulate the natural rubber, and thereafter concentrated. Other processes for recovering or harvesting natural rubber from natural sources are known.

SUMMARY

Disclosed herein are processes for recovering rubber from an aqueous natural rubber latex that contains natural rubber, water, extractables, and one or more additives, and is essentially free of lignocellulosic plant material. In one embodiment, the process comprises the steps of: contacting the latex with a separating solvent composition comprising at least one hydrocarbon solvent and at least one organic polar solvent whereby at least 75% of the natural rubber is separated from the water and a solution having a viscous rubber phase containing natural rubber and a reduced amount of extractables is formed; isolating the viscous rubber phase; and drying the viscous rubber phase to create a resultant natural rubber wherein the amount of extractables is 5% by weight or less.

Another embodiment includes a process comprising the steps of: contacting the aqueous natural rubber latex with a first treatment solution whereby at least 75% of the natural rubber coagulates and a mixture containing coagulated natural rubber, water, and extractables is formed; collecting the coagulated natural rubber; contacting the coagulated natural rubber with a second treatment solution comprising at least one organic polar solvent in order to preferentially solvate the extractables; and drying the coagulated natural rubber to create a resultant natural rubber wherein the amount of extractables is 5% by weight or less.

Yet another embodiment includes a process comprising the steps of: freezing the aqueous natural rubber latex, whereby at least 75% of the natural rubber coagulates and a mixture containing coagulated natural rubber, water, and extractables is formed; thawing the mixture; collecting the coagulated natural rubber; contacting the coagulated natural rubber with a treatment solution comprising at least one organic polar solvent in order to preferentially solvate the extractables; and drying the coagulated natural rubber to create a resultant natural rubber wherein the amount of extractables is 5% by weight or less.

DETAILED DESCRIPTION

Disclosed herein are processes for recovering rubber from an aqueous natural rubber latex that contains natural rubber, water, extractables, and one or more additives, and is essentially free of lignocellulosic plant material.

In one embodiment, the process comprises the steps of: contacting the latex with a separating solvent composition comprising at least one hydrocarbon solvent and at least one organic polar solvent whereby at least 75% of the natural rubber is separated from the water and a solution having a viscous rubber phase containing natural rubber and a reduced amount of extractables is formed; isolating the viscous rubber phase; and drying the viscous rubber phase to create a resultant natural rubber wherein the amount of extractables is 5% by weight or less. When the natural rubber is separated from the water of the aqueous natural rubber latex it is contemplated that the natural rubber coagulates to form a viscous rubber phase. The use of the term viscous rubber phase herein is meant to include a swollen gel and a viscous liquid containing rubber.

Generally, any hydrocarbon solvent may be used in the separating solvent composition provided it preferentially solvates natural rubber in a natural rubber latex. For example, hydrocarbon solvents suitable for use include but are not limited to the following: alkanes having from 4 to 9 carbon atoms such as heptane, nonane, pentane, and preferably hexane; cycloalkanes having from 5 to 10 carbon atoms such as cyclohexane, cyclopentane, and the like; aromatics or alkyl substituted aromatics having from 6 to 12 carbon atoms such as benzene, xylene, toluene, and the like. Mixtures of two or more hydrocarbons may also be used. Furthermore, any organic polar solvent may be used in the separating solvent composition provided it preferentially solvates a portion of non-rubber extractables in a natural rubber latex and acts to coagulate natural rubber. Broadly stated, extractables are any naturally occurring non-rubber chemical entity present in rubber, including but not limited to resins (such as terpenes), fatty acids, proteins, and inorganic materials. For example, organic polar solvents suitable for use include but are not limited to the following: alcohols having from 1 to 8 carbon atoms such as ethanol, isopropanol, methanol, and the like; and ketones having from 3 to 8 carbon atoms such as acetone, methyl ethyl ketone, and the like. Mixtures of two or more organic polar solvents may also be used.

Normally, organic polar solvents act to coagulate the natural rubber in the latex, whereas hydrocarbons act to solvate the natural rubber. In this way, the ratio of organic polar solvent to hydrocarbon solvent in the separating solvent composition influences the state or phase of the natural rubber after contact of the latex with the separating solvent composition. Generally, as the relative fraction of organic polar solvent to hydrocarbon solvent is increased, the natural rubber increasingly coagulates to form a semi-solid or solid mass. In contrast, as the fraction of hydrocarbon solvent is increased, the natural rubber increasingly forms a swollen gel or viscous liquid, as the natural rubber is increasingly solvated by the hydrocarbon. It is generally preferred to adjust the ratio such that a swollen gel or viscous liquid phase of the natural rubber is obtained in the latex after it has been contacted by the separating solvent composition. Preferably, the at least one hydrocarbon solvent is present in an amount between 5% and 60% by weight and the at least one organic polar solvent is present in an amount between 95% and 40% by weight, based on the total weight of the separating solvent composition. Optionally, the at least one hydrocarbon solvent is present in an amount between 5% and 25% by weight and the at least one organic polar solvent is present in an amount between 75% and 95% by weight, based on the total weight of the separating solvent composition.

The amount of separating solvent composition utilized to contact the aqueous natural rubber latex may vary and is generally an amount sufficient to separate at least 75% of the natural rubber from the water, and preferably to reduce the extractables content of the natural rubber that is recovered from the aqueous natural rubber latex. For example, in one embodiment the weight ratio of separating solvent composition to latex is 100 to 1, respectively. In another embodiment, the ratio is 20 to 1. In yet another embodiment, the ratio is 10 to 1. Moreover, in certain embodiments, multiple steps of contacting the aqueous natural rubber latex with a separating solvent composition may be utilized in order to further reduce the extractables content of the natural rubber that is recovered from the aqueous natural rubber latex.

Generally, any method of contacting the aqueous natural rubber latex with the separating solvent composition known to those skilled in the art may be used, including but not limited to any continuous countercurrent liquid-liquid contacting system (such as mixer-settler and column arrangements) and any batch-type system.

After the aqueous natural rubber latex has been contacted with the separating solvent solution and a solution having a viscous rubber phase containing natural rubber and a reduced amount of extractables has been formed, the viscous rubber phase is isolated from one or more other phases that may have been formed using any suitable method known to those skilled in the art, including but not limited to decanting the one or more other phases away from the viscous rubber phase. Once isolated, the viscous rubber phase is dried to create a resultant natural rubber that contains an amount of extractables of 5% by weight or less. In certain embodiments, the amount of extractables in the dried resultant natural rubber is 1% by weight or less. Generally, any method of drying the viscous rubber phase known to those skilled in the art may be used, including but not limited to the application of heat and vacuum. Generally, the resultant natural rubber is dried until it contains less than 1% solvent by weight. In certain embodiments, the amount of any solvent in the dried resultant natural rubber is less than 0.1% by weight.

A resultant natural rubber that is solid and that may be ready for further processing, such as vulcanizing, is obtained upon drying the viscous phase.

Optionally, prior to drying the viscous rubber phase, it is contacted with at least one extracting solvent composition comprising at least one organic polar solvent. Generally, any organic polar solvent may be used provided it preferentially solvates non-rubber extractables in natural rubber. As discussed previously, extractables are any naturally occurring non-rubber chemical entity present in rubber, including but not limited to resins (such as terpenes), fatty acids, proteins, and inorganic materials. Organic polar solvents suitable for use include but are not limited to the following: alcohols having from 1 to 8 carbon atoms such as ethanol, isopropanol, methanol, and the like; and ketones having from 3 to 8 carbon atoms such as acetone, methyl ethyl ketone, and the like. Mixtures of two or more organic polar solvents may also be used. In a particular embodiment, the extracting solvent composition comprises acetone.

Since organic polar solvents tend to preferentially solvate non-rubber extractables that are present in natural rubber, an extracting solvent composition that contacts natural rubber solvates, or extracts, a portion of the non-rubber extractables. A number of methods exist and are known to those skilled in the art for contacting the viscous rubber phase with the extracting solvent composition, any of which may be used herein, including but not limited to any continuous countercurrent extraction system (such as mixer-settler and column arrangements) and any batch-type system.

Natural rubber ("rubber") comprises cis-polyisoprene and, as used herein, also includes trans-polyisoprene and mixtures of the two. A number of various plants produce natural rubber in the form of sap that contains the natural rubber in aqueous suspension. In certain plants, such as *Hevea brasiliensis* (Hevea trees), *Ficus elastica* (India rubber tree), and *Cryptostegia grandiflora* (Madagascar rubbervine), the rubber-bearing sap flows freely and is recovered simply by tapping the plant. In other plants ("non-Hevea plants") the rubber-bearing sap is not as accessible, since the sap is stored in individual cells contained within the roots or stems, which cells must be broken down by physical or other means. Such plants include but are not limited to *Parthenium argentatum* (Guayule shrub), *Taraxacum Kok-Saghyz* (Russian dandelion), *Euphorbia lathyris* (gopher plant), *Parthenium incanum* (mariola), *Chrysothamnus nauseosus* (rabbitbrush), *Pedilanthus macrocarpus* (candililla), *Asclepias syriaca, speciosa, subulata*, et al (milkweeds), *Solidago altissima, graminifolia rigida*, et al (goldenrods), *Cacalia atripilicifolia* (pale Indian plantain), *Pycnanthemum incanum* (mountain mint), *Teucreum canadense* (American germander) and *Campanula Americana* (tall bellflower). Many other plants which produce rubber and rubber-like hydrocarbons are known, particularly among the Compositae, Euphorbiaceae, Campanulaceae, Labiatae, and Moracea families. Mixtures may be used.

In certain embodiments, the processes for recovering rubber from an aqueous natural rubber latex that are disclosed herein are performed utilizing a rubber-bearing sap that has been harvested or recovered from a non-Hevea plant. In other words, in those embodiments the rubber-bearing sap has not been harvested or recovered from a Hevea tree, an India rubber tree or a Madagascar rubbervine. Preferably, the rubber-bearing sap has been harvested or recovered from a Guayule shrub.

The aqueous natural rubber latex that is utilized in the processes disclosed herein may have resulted from contacting rubber-bearing sap with various solvents and other additives and/or otherwise processing rubber-bearing sap that has been harvested or recovered from a natural source. Additives that are often utilized include, but are not limited to, various solvents, surfactants, and surface active agents. The rubber-bearing sap typically contains non-rubber extractables which vary by type and amount depending on source. Lignocellulosic plant material (material that comprises the structural cells of woody plants) has also typically been removed by physical methods, such as filtration so that the aqueous natural rubber latex utilized in the processes disclosed herein is essentially free of lignocellulosic plant material. By essentially free of lignocellulosic plant material is meant that the majority of such material has been removed, preferably at least 95% of such material has been removed, and even more preferably at least 99% of such material has been removed.

Rubber is typically cross-linked, or vulcanized, in order to make useful products. While not wishing to be bound by any theory, it is believed that extractables may adversely affect the vulcanization process and/or the physical properties of vulcanized products. In the processes described herein, the natural rubber (either coagulated or in a viscous phase) may be contacted any number of times using an extracting solvent composition in order to reduce the amount of extractables contained in the rubber, and thereafter dried to create a resultant natural rubber with a reduced amount of extractables. In one embodiment, the extractables content of the resultant natural rubber is reduced to an amount of 5% by weight or less (based on the weight of the resultant natural rubber). In yet another embodiment, the extractables content in the resultant natural rubber is 2% by weight or less. In yet another embodiment, the extractables content in the resultant natural rubber is 1% by weight or less.

Another embodiment of the process for recovering rubber from an aqueous natural rubber latex that contains natural rubber, water, extractables, and one or more additives, and is essentially free of lignocellulosic plant material comprises the steps of: contacting the latex with a first treatment solution whereby at least 75% of the natural rubber coagulates and a mixture containing coagulated natural rubber, water, and extractables is formed; collecting the coagulated natural rubber; contacting the coagulated natural rubber with a second treatment solution comprising at least one organic polar solvent in order to preferentially solvate the extractables; and drying the coagulated natural rubber to create a resultant natural rubber wherein the amount of extractables is 5% by weight or less.

Various solvents and chemical, in various combinations, may be utilized for the first treatment solution. More specifically, the first treatment solution may comprise any solution capable of coagulating at least 75% of the natural rubber in aqueous natural rubber latex. In one embodiment, the first treatment solution comprises an organic acid, a mineral acid, a salt of either and combinations thereof. An organic acid is generally any acid with a carbon-atom backbone, often containing a carboxyl group, including but not limited to any carboxylic acid. A mineral acid is generally an acid derived from one or more inorganic compounds that does not contain any carbon atoms, including but not limited to sulfuric acid, hydrochloric acid and nitric acid. Preferably, the first treatment solution comprises acetic acid, formic acid, sulfuric acid, aqueous aluminum sulfate, aqueous calcium chloride, and mixtures thereof. In one embodiment, the first treatment solution comprises an organic acid, a mineral acid, a salt of either, and combinations thereof, and the amount of extractables in the resultant natural rubber is 5% by weight or less, preferably 2% by weight or less and even more preferably 1% by weight or less.

In another embodiment, the first treatment solution comprises at least one organic polar solvent. Organic polar solvents suitable for use include but are not limited to the following: alcohols having from 1 to 8 carbon atoms such as ethanol, isopropanol, methanol, and the like; and ketones having from 3 to 8 carbon atoms such as acetone, methyl ethyl ketone, and the like. Mixtures of two or more organic polar solvents may also be used. In one embodiment, the first treatment solution comprises at least one organic polar solvent and the amount of extractables in the resultant natural rubber is 5% by weight or less, preferably 2% by weight or less and even more preferably 1% by weight or less.

Generally any method of contacting the aqueous natural rubber latex with the first treatment solution known to those skilled in the art may be used, including but not limited to any continuous countercurrent liquid-liquid contacting system (such as mixer-settler and column arrangements) and any batch-type system.

After the aqueous natural rubber latex is contacted with a first treatment solution and a mixture containing coagulated natural rubber, water and extractables is formed, the coagulated natural rubber is collected. The coagulated natural rubber is collected by any suitable method, including but not limited to centrifugation, filtration, and phase separation. For example, in certain embodiments, a viscous-type phase containing the natural rubber may result along with one or more liquid phases. The viscous rubber phase may be separated by various methods within the knowledge of one of skill in the art, including, but not limited to, decanting the liquid phase or phases away from the viscous rubber phase. Optionally, the collected coagulated natural rubber may be rinsed with one or more portions of water.

After the coagulated natural rubber has been collected, it is contacted with a second treatment solution comprising at least one organic polar solvent. The second treatment solution may generally comprise any organic polar solvent provided it preferentially solvates non-rubber extractables in natural rubber. Organic polar solvents suitable for use include but are not limited to the following: alcohols having from 1 to 8 carbon atoms such as ethanol, isopropanol, methanol, and the like; and ketones having from 3 to 8 carbon atoms such as acetone, methyl ethyl ketone, and the like. Mixtures of two or more organic polar solvents may also be used. The second treatment solution may be the same as or different from the first treatment solution. The second treatment solution may also comprise, in addition to the at least one organic polar solvent, at least one hydrocarbon solvent.

Prior to contacting the coagulated natural rubber with the second treatment solution, it may be advantageous in some embodiments to reduce the size of the coagulated rubber by, for example, shredding or tearing the rubber into pieces. Generally, any method of contacting the coagulated natural rubber with the second treatment solution known to those skilled in the art may be used, including but not limited to any continuous countercurrent liquid-liquid contacting system (such as mixer-settler and column arrangements) and any batch-type system. Additionally, it is explicitly contemplated that in certain embodiments the coagulated natural rubber may be contacted with the second treatment solution prior to collecting the coagulated natural rubber.

After the coagulated natural rubber is contacted with a second treatment solution, it is dried to create a resultant natural rubber with an amount of extractables of 5% by weight or less (based on the weight of the dried resultant natural rubber). Generally, any method of drying the coagulated natural rubber known to those skilled in the art may be used, including but not limited to the application of heat and vacuum. Generally, the resultant natural rubber is dried until it contains less than 1% solvent by weight. In certain embodiments, the amount of any solvent in the dried resultant natural rubber is less than 0.1% by weight.

The resultant natural rubber that is created when the coagulated natural rubber is dried contains an amount of extractables of 5% by weight or less, based on the weight of the dried natural rubber. In certain embodiments, the amount of extractables in the dried resultant natural rubber is 2% by weight or less or 1% by weight or less.

Optionally, before the coagulated natural rubber is dried, in certain embodiments the mixture that results from contacting the coagulated natural latex with a second treatment may be separated from one or more other phases. For example, in certain embodiments, a viscous-type phase containing the natural rubber may result along with one or more liquid phases. The viscous rubber phase may be separated by various methods within the knowledge of one of skill in the art, including, but not limited to, decanting the liquid phase or phases away from the viscous rubber phase.

The presence of an amount of carbon black in the coagulated natural rubber can increase the amount of extractables that are solvated, or extracted, from the natural rubber by an extracting solvent (e.g., a separating solvent composition, a first treatment solution, or a second treatment solution), such as an organic polar solvent. While not wishing to be bound by a particular theory, it is believed that the presence of carbon black increases porosity in the coagulated natural rubber, and thereby allows an extracting solvent to penetrate the coagulated natural rubber and contact a relatively large surface area of the rubber.

In one embodiment of the processes described herein, carbon black is optionally added to the aqueous natural rubber latex prior to contacting the latex with a first treatment solution. The carbon black is added in an amount between 0.5% and 6% by weight based on the weight of the resultant dried natural rubber. Generally, the carbon black may be added to the aqueous natural rubber latex by any method known to those skilled in the art, including but not limited to creating an aqueous dispersion or slurry of carbon black and subsequently combining the dispersion or slurry with the aqueous natural rubber latex.

In another embodiment, carbon black is optionally added to the coagulated natural rubber prior to the contacting the coagulated natural rubber with a second treatment solution. The carbon black is added in an amount between 0.5% and 6% by weight based on the weight of the resultant dried natural rubber. Generally, the carbon black may be added to the coagulated natural rubber by any method known to those skilled in the art, including but not limited to creating an aqueous dispersion or slurry of carbon black and subsequently combining the dispersion or slurry with the coagulated natural rubber accompanied by kneading, mixing, or other physical mechanism to force the dispersion or slurry into the coagulated natural rubber.

In a particular embodiment, carbon black is added to either the aqueous natural rubber latex or the coagulated natural rubber (or both), and the first and second treatment solutions consist essentially of acetone.

Yet another embodiment of the process for recovering rubber from an aqueous natural rubber latex that contains natural rubber, water, extractables, and one or more additives, and is essentially free of lignocellulosic plant material comprises the steps of: freezing the latex, whereby at least 75% of the natural rubber coagulates and a mixture containing coagulated natural rubber, water, and extractables is formed; thawing the mixture; collecting the coagulated natural rubber; contacting the coagulated natural rubber with an extraction solution comprising at least one organic polar solvent in order to preferentially solvate the extractables; and drying the coagulated natural rubber to create a resultant natural rubber wherein the amount of extractables is 5% by weight or less.

In a first step, the aqueous natural rubber latex is frozen to create a mixture containing natural rubber, water and extractables. In general, freezing an aqueous natural rubber latex effects coagulation of the suspended natural rubber, and typically any method for freezing an aqueous solution is suitable for the processes described herein. Such freezing methods include but are not limited to: providing a sub-freezing atmosphere to the latex and/or providing cooling elements (such as fins, plates, scrapped tube walls or rolls) to the latex. Freezing the aqueous natural rubber proceeds until it is completely frozen or until at least 75% of the natural rubber has been coagulated, upon which a mixture containing coagulated natural rubber, water (completely or partially frozen), and extractables is obtained. It is noted that at this point in the process the extractables may be present in both the coagulated natural rubber and in the water.

After the aqueous natural rubber latex has been frozen, completely or partially, the frozen mixture is thawed. Generally, thawing may be accomplished by any suitable method known to one of ordinary skill in the art, including but not limited to exposing the frozen mixture to the ambient atmosphere, contacting the frozen mixture with a heating element or elements, and placing the frozen mixture in an oven (with or without vacuum).

After the frozen mixture is thawed, the coagulated natural rubber is collected. Generally, any suitable method for collecting coagulated natural rubber in an aqueous medium known to one of ordinary skill in the art may be used, including but not limited to centrifugation, flotation, and filtration.

After the coagulated natural rubber has been collected, it is contacted with an extraction solution comprising at least one organic polar solvent. The extraction solution may generally comprise any organic polar solvent provided it preferentially solvates non-rubber extractables in natural rubber. Organic polar solvents suitable for use include but are not limited to the following: alcohols having from 1 to 8 carbon atoms such as ethanol, isopropanol, methanol, and the like; and ketones having from 3 to 8 carbon atoms such as acetone, methyl ethyl ketone, and the like. Mixtures of two or more organic polar solvents may also be used. The extraction solution may also comprise, in addition to the at least one organic polar solvent, at least one hydrocarbon solvent.

Prior to contacting the coagulated natural rubber with the extraction solution, it may be advantageous in some embodiments to reduce the size of the coagulated rubber by, for example, shredding or tearing the rubber into pieces. Generally, any method of contacting the coagulated natural rubber with the extraction solution known to those skilled in the art may be used, including but not limited to any continuous countercurrent liquid-liquid contacting system (such as mixer-settler and column arrangements) and any batch-type system. Additionally, it is explicitly contemplated that in certain embodiments the coagulated natural rubber may be contacted with the extraction solution prior to collecting the coagulated natural rubber.

After the coagulated natural rubber is contacted with the extraction solution, it is dried to create a resultant natural rubber with an amount of extractables of 5% by weight or less (based on the weight of the dried resultant natural rubber). Generally, any method of drying the coagulated natural rubber known to those skilled in the art may be used, including but not limited to the application of heat and vacuum. Generally, the resultant natural rubber is dried until it contains less than 1% solvent by weight. In certain embodiments, the amount of any solvent in the dried resultant natural rubber is less than 0.1% by weight.

The resultant natural rubber that is created when the coagulated natural rubber is dried contains an amount of extractables of 5% by weight or less, based on the weight of the dried natural rubber. In certain embodiments, the amount of extractables in the dried resultant natural rubber is 2% by weight or less or 1% by weight or less.

Optionally, before the coagulated natural rubber is dried, in certain embodiments the mixture that results from contacting the coagulated natural latex with the extraction solution may be separated from one or more other phases. For example, in certain embodiments, a viscous-type phase containing the natural rubber may result along with one or more liquid phases. The viscous rubber phase may be separated by various methods within the knowledge of one of skill in the art, including, but not limited to, decanting the liquid phase or phases away from the viscous rubber phase.

The presence of an amount of carbon black in the coagulated natural rubber can increase the amount of extractables that are solvated, or extracted, from the natural rubber by an extracting solvent, such as an organic polar solvent. In one embodiment of the processes described herein, carbon black is optionally added to the aqueous natural rubber latex prior to freezing the latex. The carbon black is added in an amount between 0.5% and 6% by weight based on the weight of the resultant dried natural rubber. Generally, the carbon black may be added to the aqueous natural rubber latex by any method known to those skilled in the art, including but not limited to creating an aqueous dispersion or slurry of carbon black and subsequently combining the dispersion or slurry with the aqueous natural rubber latex.

In another embodiment, carbon black is optionally added to the coagulated natural rubber prior to contacting the coagulated natural rubber with the extraction solution. The carbon black is added in an amount between 0.5% and 6% by weight based on the weight of the resultant dried natural rubber. Generally, the carbon black may be added to the coagulated natural rubber by any method known to those skilled in the art, including but not limited to creating an aqueous dispersion or slurry of carbon black and subsequently combining the dispersion or slurry with the coagulated natural rubber accompanied by kneading, mixing, or other physical mechanism to force the dispersion or slurry into the coagulated natural rubber. In a particular embodiment, carbon black is added to either the aqueous natural rubber latex or the coagulated natural rubber (or both), and the extraction solution consist essentially of acetone.

The invention will be more readily understood by reference to the following examples. There are, of course, many other embodiments or illustrations which will become apparent to one skilled in the art, and it will accordingly be recognized that these examples are given for the purpose of illustration only, and are not to be construed as limiting the scope of this invention in any way.

EXAMPLES

The following test procedures were used in carrying out several of the examples, as indicated below.
(a) Determination of the amount of extractables—ASTM D297, Section 18, modified to allow use of a standard Soxhlet extraction apparatus, with acetone.
(b) Micro Dumbbell Testing—ASTM D412.
(c) Standard natural rubber test formulation—see Table 1

TABLE 1

| Ingredient | Parts per 100 rubber |
|---|---|
| Rubber | 100 |
| N339 Carbon Black | 50 |
| Stearic Acid | 2 |
| Antioxidant (6PPD)[1] | 1 |
| Zinc Oxide | 3 |
| Accelerator[2] | 0.8 |
| Sulfur | 1.3 |
| Total | 158.1 |

[1]Antioxidant is SANTOFLEX 6PPD which is N-(1,3-dimethylbutyl)-N'-phenyl-p-phenylenediamine, produced and sold by FLEXSYS, Akron, Ohio.
[2]Accelerator is N-tert-butyl-2-benzothiazole sulfenamide (TBBS).

The preparation of the natural rubber (NR) formulations involves mixing the components shown in the table by use of a Brabender Mixer, and then molding to sheets having a thickness of about 2 mm, followed by pressing cure at 145° C. for 30 minutes.

Example 1

A 149.03 gram sample of an aqueous natural rubber latex marketed by Yulex Corp. and having about 48.9% total solids from guayule shrub (about 40.7% purified rubber) was mixed with 3 liters of a 50/50 (volume) composition of acetone and mixed hexane isomers for about 30 minutes. This resulted in the formation of one viscous rubber phase and two liquid phases.

The liquid phases were decanted. The solid phase was squeezed to remove trapped pockets of liquid in the wet rubber. The squeezed rubber was cut into small pieces, and mixed with a further 3 liters of a fresh composition comprising 50/50 (volume) of acetone and mixed hexane isomers, for an additional 30 minutes. The resultant liquid was decanted, and the resultant solid rubber was squeezed. The squeezed solid rubber was vacuum dried to remove all solvent present. The dry rubber weight was 60.06 grams. By calculation, it is determined that the coagulation of the rubber latex with the 50/50 (volume) acetone/hexane composition, yielded 60.06 grams of rubber, which indicates that 12.82 grams of extractables were removed. The calculation is made as follows:

$$0.489 \times 149.03 = 72.88 \text{ grams solids in latex sample;}$$

$$72.88 \text{ grams solids} - 60.06 \text{ grams rubber} = 12.82 \text{ grams of extractables removed.}$$

In order to determine the amount of extractables remaining in the dried rubber, a small sample of the dried rubber was subjected to a Soxhlet extraction, with acetone. As a result, there was obtained an additional 0.90 weight % extractables, based on the weight of the dried rubber, indicating that the dried rubber contained 0.90 weight % extractables.

The dry rubber was dissolved in hexane to form a uniform solution. One part per 100 parts rubber (by weight) of Santoflex 134 antioxidant, produced and sold by Flexsys Rubber Chemicals, Akron, Ohio was added, and kneaded into the rubber solution. The solvent was then removed by vacuum drying.

The resultant dried and stabilized rubber, identified as Sample 1, was then placed in a 60° C. forced air oven for storage stability evaluation. Mooney viscosities as shown in Table 2A below were measured before and after aging in the oven.

TABLE 2A

| Sample 1 | Before Aging | After 7 Days |
|---|---|---|
| ML (1 + 4) | 95.1 | 94.7 |

The resultant dried and stabilized rubber product was further evaluated by compounding the dry rubber product in the standard all-natural rubber test recipe described herein. Test data for the compounded dried rubber product of Example 1, identified as Sample 1A, is listed with data for commercially available *Hevea* natural rubber, identified as *Hevea* #1, in the following Table 2B for the purpose of comparison.

TABLE 2B

| Micro Dumbbell Tensile @23 C. | Sample1A | Hevea #1 |
| --- | --- | --- |
| Max Stress (MPA) | 32.5 | 31.5 |
| 100% (MPA) | 3.0 | 3.3 |
| 200% (MPA) | 9.8 | 10.2 |
| 300% (MPA) | 18.0 | 19.6 |
| Brk Strain % | 497 | 448.9 |
| Toughness | 71.7 | 61.6 |
| Micro Dumbbell Tensile @100 C. | Sample 1A | Hevea #1 |
| Max Stress (MPA) | 21.2 | 21.8 |
| 100% (MPA) | 2.5 | 2.6 |
| 200% (MPA) | 6.3 | 6.5 |
| 300% (MPA) | 11.0 | 11.7 |
| Brk Strain % | 662 | 513.6 |
| Toughness | 76.5 | 51.4 |

Also, for comparative purposes, gel permeation chromatography (GPC) was performed on Sample 1, with the following results: Mn=464,141; Mw=1,288,439; Mw/Mn=2.78.

From the data in Table 2B, it is observed that the rubber product obtained in Example 1 compares very favorably in performance to the commercially available *Hevea* natural rubber (*Hevea* #1).

Example 2

Example 2 utilizes formic acid in coagulation of the natural rubber latex, rather than the composition of hydrocarbon solvent and organic polar solvent, as in Example 1.

A 200 gram sample of an aqueous natural rubber latex marketed by Yulex Corp. and having about 50% total solids (about 41% purified rubber) was diluted by adding 90 grams of distilled water, resulting in a mixture having a pH of 8.0. To the natural rubber latex was added 25 grams of a 5% formic acid solution in water, and the resulting mixture was stirred for about 1 hour, to complete the coagulation of the rubber. At this point, the pH was between 5 and 6. The rubber sample was then vacuum dried, to remove residual water.

In order to determine the amount of extractables remaining in the dried rubber, a small sample of the dried rubber product prepared in this example was then subjected to a Soxhlet extraction utilizing acetone. The Soxhlet extraction revealed that the dried rubber contained 11% of acetone extractables, indicating that the dried polymer contained 11 weight % extractables. This demonstrates that the process of Example 2 is not as effective as the process of Example 1 in removing or reducing acetone extractable impurities from the dried rubber product.

When evaluated in the standard rubber test recipe, stated above, it becomes clear that the degree to which acetone extractables are removed from the dried rubber product obtained from the natural rubber latex is an important factor in producing a product having properties comparable to *Hevea* natural rubber. In Table 3 below, the dried rubber product of Example 2 is identified as Sample 2A, and the *Hevea* natural rubber is identified as *Hevea* #1.

TABLE 3

| Micro Dumbbell Tensile @23 C. | Sample 2A | Hevea #1 |
| --- | --- | --- |
| Max Stress (MPA) | 17.1 | 31.5 |
| 100% (MPA) | 1.3 | 3.3 |
| 200% (MPA) | 2.8 | 10.2 |
| 300% (MPA) | 5.3 | 19.6 |
| Brk Strain % | 679 | 448.9 |
| Toughness | 49.3 | 61.6 |
| Micro Dumbbell Tensile @100 C. | Sample 2A | Hevea #1 |
| Max Stress (MPA) | 13.4 | 21.8 |
| 100% (MPA) | 1.1 | 2.6 |
| 200% (MPA) | 2.1 | 6.5 |
| 300% (MPA) | 3.4 | 11.7 |
| Brk Strain % | 929 | 513.6 |
| Toughness | 56.9 | 51.4 |

Also, for comparative purposes, GPC was performed on Sample 2A prior to compounding in the standard test recipe, with the following results: Mn=372,718; Mw=876,516; Mw/Mn=2.35.

From the above data, it is evident that the values obtained for the natural rubber product of this example are, generally, lower than the values obtained for *Hevea* natural rubber, and it would be difficult to conclude that the two samples, Sample 2 and *Hevea* #1, are comparable.

Example 3

A 67.6 gram sample of an aqueous natural rubber latex marketed by Yulex Corp. and having about 48.9% total solids from guayule shrub was diluted by adding distilled water to a total weight of 338 grams, for an approximate total solids content of 10%.

With strong agitation, the diluted latex was added slowly to a mixture of 203.2 grams of hexane and 812.8 grams of acetone. When agitation was stopped, the mixture separated within 10 minutes to form three distinct phases. After decanting the very fluid upper and lower liquid phases, the middle phase (a viscous phase), was recovered.

The viscous phase was then mixed with strong agitation with 457 grams of hexane and 457 grams of acetone. After agitation, the mixture separated quickly into two phases. The upper, very fluid phase was decanted, and the lower, viscous phase was vacuum dried to constant weight.

The final weight of dry product, identified as Sample 3, weighed 23.66 grams. After allowing for the weights of the various samples removed during the process, the total weight of rubber in the original latex was found to be 28.80 grams, indicating a purified rubber content in the original, undiluted latex of 42.6%.

In order to determine the amount of extractable in the dried final product, a sample of the final rubber was extracted by the Soxhlet procedure with acetone, and found to contain 2.31 weight % acetone extractables, indicating that the final rubber contained 2.31 weight % extractables.

A second small sample of the final rubber was stabilized with approximately 1 part Santoflex 134 per 100 parts rubber, was analyzed by GPC and found to have the following parameters: Mn=482,888; Mw=1,211,165; Mw/Mn=2.51.

By comparison with the GPC results and % acetone extractables for the rubber prepared in Example 1, it is reasonable to predict favorable compounded tensile strength results compared to the *Hevea* #1 control.

Example 4

A 12.5 gram sample of the same aqueous natural rubber latex as utilized in Example 3 was diluted with distilled water to a total weight of 625 grams, for an approximate total solids content of 1%.

With strong agitation, the diluted latex was added slowly to a mixture of 165.25 grams of hexane and 1652.65 grams of acetone. When agitation was stopped, the mixture separated within 10 minutes to form three distinct phases. After decanting the very fluid upper and lower phases, the middle phase (a viscous liquid) was recovered.

The viscous phase was then mixed with strong agitation with 90.63 grams of hexane and 90.63 grams of acetone. After agitation, the mixture separated quickly into two phases. The upper, very fluid phase was decanted, and the lower, viscous phase was vacuum dried to constant weight.

The final weight of dry product weighed 4.93 grams, indicating a purified rubber content in the original, undiluted latex of 39.4%.

In order to determine the amount of extractables in the dried final product, a sample of the final rubber was extracted by the Soxhlet extraction procedure with acetone, and was found to contain 1.52 weight % acetone extractables, indicating that the dried polymer contained 1.52 weight % extractables.

A second sample of the final rubber was stabilized with approximately 1 part of Santoflex 134 per 100 parts rubber, and was analyzed by GPC and found to have the following parameters: Mn=445,776; Mw=1,258,677; Mw/Mn=2.82.

By comparison with the GPC results and % acetone extractables for the rubber prepared in Example 1, it is reasonable to predict favorable compounded tensile strength results compared to the *Hevea* #1 control.

Example 5

A slurry of N339P carbon black, marketed by Columbian Chemicals of Proctor, W. Va. was formed by mixing 10.5 grams carbon black with an approximately equal volume of distilled water, several grams of 40% potassium oleate paste, and several cc's of 5% aqueous KOH to raise the pH to approximately 8. The mixture was stirred until a thick slurry was formed, free of lumps.

The thick slurry was added to 166.67 grams of an aqueous natural rubber latex marketed by Yulex Corp. and having about 48.9% total solids from guayule shrub (about 40.7% purified rubber) and stirred to blend. No settling of the carbon black and no coagulation of the rubber was observed.

Next, 3.9 mL of a 40 wt % antioxidant emulsion was added. The emulsion was prepared by mixing 50 grams each of Santoflex 134 and TNPP (trisnonylphenyl phosphite) with 150 grams water and 10 grams of 40% K-oleate paste in water, adding aqueous NaOH to pH=10, followed by mixing in a Waring blender to form a stable emulsion. Using this formulation, the addition of 0.052 grams of the emulsion per gram of rubber provides 1 part per hundred of each stabilizer.

Next, 2500 mL of a 5% aqueous solution of $Al_2(SO_4)_3$ ("the coagulant solution") was placed in a 1-gallon Waring blender.

The mixture of [aqueous natural rubber latex+carbon black+antioxidant emulsion] was slowly poured into the coagulant solution, with the blender set to "low" speed, for 10 seconds. Then, a cover was placed on the blender and the speed was raised to "medium" for 15 additional seconds.

The resultant coagulant mixture was poured onto a No. 70 standard US sieve tray and rinsed with tap water. Some unincorporated carbon black was present in the rinse.

The coagulated rubber was placed in a 1 gallon glass jar and mixed with approximately 3 quarts of tap water, followed by decanting the water, and repeated twice. Little or no free carbon black was observed in the last rinse. The coagulant rubber was not squeezed so as to maintain maximum porosity.

Next, the wet coagulated rubber was torn into approximately 1" pieces and placed onto a Soxhlet extraction apparatus with a Whatman 90×200 mm cellulose extraction thimble, condenser, and 3000 mL flask. Then, 1000 mL acetone was added to the flask and heated via an electric heating mantle to reflux. The extraction was allowed to continue for 21 hours. The polymer remained quite porous and easily broke into discrete pieces.

Next, an acetone solution containing 1 part per hundred each of Santoflex 134 and TNPP (sufficient to wet the coagulated rubber) was added and kneaded to force the solution into the pores of the coagulated rubber.

The coagulated rubber was then placed into a vacuum oven at 50° C. for 4.25 hours to remove the remaining acetone. Then, the acetone-free coagulated rubber was placed in a forced air oven at 83° C. overnight. The sample is indicated as Sample 5. The total weight of the dry resultant rubber and carbon black was 69.28 grams.

Thermogravimetric analysis showed that the rubber contained 11.03 parts per hundred parts rubber of carbon black and acetone extraction indicated the presence of 3.5 weight % acetone extractables (based on the weight of the total product [rubber+carbon black+extractables]). Correcting for the added antioxidants, the mixture contained 1.54 wt % (3.5–1.96 wt %) acetone extractables.

The rubber was next compounded using the standard test recipe referenced above, but with the carbon black addition corrected to compensate for the carbon black content of Sample 5. In Table 4 below, the compounded rubber is indicated as Sample 5A and *Hevea* natural rubber is identified as *Hevea* #1.

TABLE 4

| Micro Dumbbell Tensile @23 C. | Sample 5A | Hevea #1 |
|---|---|---|
| Max Stress (MPA) | 29.9 | 31.5 |
| 100% (MPA) | 2.9 | 3.3 |
| 200% (MPA) | 8.8 | 10.2 |
| 300% (MPA) | 16.8 | 19.6 |
| Brk Strain % | 472 | 448.9 |
| Toughness | 60.3 | 61.6 |
| Micro Dumbbell Tensile @100 C. | Sample 5A | Hevea #1 |
| Max Stress (MPA) | 22.1 | 21.8 |
| 100% (MPA) | 2.2 | 2.6 |
| 200% (MPA) | 5.3 | 6.5 |
| 300% (MPA) | 9.4 | 11.7 |
| Brk Strain % | 714 | 513.6 |
| Toughness | 83.2 | 51.4 |

From the data in Table 4, it is observed that the rubber product obtained in Example 5 compares favorably in performance to commercially available *Hevea* natural rubber (Hevea #1).

Example 6

This example demonstrates that acetone, by itself, will coagulate an aqueous natural rubber latex.

A 77.6 gram sample of an aqueous natural rubber latex marketed by Yulex Corp. and having about 50% total solids was added slowly, with good mixing, to 250 grams acetone. The natural rubber in the latex coagulated to form a solid mass.

It is expected that an extraction of the rubber mass is necessary to lower the extractables content to a sufficient level, followed by a drying step to remove the residual extraction solvent from the rubber. It is expected that the efficiency of the extraction can be improved by the addition of carbon black.

Example 7

An 88.4 gram sample of an aqueous natural rubber latex marketed by Yulex Corp. and having 55% solids was placed in aluminum containers to a height of 1 cm, and frozen at −30° C. in a freezer for 30 minutes to create a frozen latex. The frozen latex was removed from the freezer and then unloaded from the containers.

After the frozen latex was melted at room temperature, the coagulated mass was separated from the water by filtration. Extra water was removed by applying 40 tons pressure on the coagulated material for several seconds. The resulting rubber had a mass of 57.6 grams. Another 9.4 grams of water was removed from the coagulated rubber by steam drum dryer, which produced 48.2 grams of water-free coagulated rubber.

A 31.2 gram sample of the water-free coagulated rubber was extracted by the Soxhlet procedure with acetone for 6 hours and found to contain 12.7% acetone extractables.

The final weight of the resultant dried rubber was found to be 27.17 grams. Although the amount of extractables remaining in the 27.17 gram sample of dried rubber itself was not measured, it is believed that the amount of extractables remaining in the sample was less than 2%. In this example, the acetone utilized in the Soxhlet procedure served as the extraction solution.

The resultant dried rubber (i.e., the 27.17 grams) was dissolved in hexane to form a uniform solution. One part per hundred rubber (by weight) of Santoflex 134 antioxidant was added and kneaded into the solution. The hexane was then removed by vacuum drying.

The resultant dried and stabilized rubber was then placed in a 60° C. forced air oven for storage stability evaluation. Mooney viscosities as shown in Table 5 below were measured before and after aging in the oven.

TABLE 5

|  | Before Aging | After 7 Days |
|---|---|---|
| ML (1 + 4) | 88.3 | 83.4 |
| T × 80 | 26.48 | 25.84 |

From the data in Table 5, it is observed that the rubber product obtained in Example 7 compares favorably in properties to the rubber product obtained by other processes disclosed herein.

Example 8

A 2.2 gram sample of N339P carbon black, marketed by Columbian Chemicals of Proctor, W. Va. was added to 100.73 grams of an aqueous natural rubber latex marketed by Yulex Corp. and having about 51.1% total solids from guayule shrub. The mixture was placed on a roller for 4 hours to achieve uniform mixing. The mixture was then placed in aluminum containers to a height of 0.5 cm, and frozen at −30° C. in a freezer for 30 minutes to create a frozen mixture. The frozen mixture was removed from the freezer and then unloaded from the container.

After thawing at room temperature, the coagulated mass was separated from the water by filtration. Extra water was removed by applying 40 tons pressure on the coagulated material for several seconds, followed by vacuum drying.

The dried coagulated material was extracted by cutting into small pieces and soaked in 1.5 liters of acetone with strong agitation for 2 hours. After decanting the acetone, the resultant rubber was vacuum dried. The final weight of the dry resultant rubber (with carbon black), indicated here as Sample 8, was found to be 53.66 grams.

A sample of 1.32 grams of the dry resultant rubber was extracted by the Soxhlet procedure using acetone and found to contain 1.52% acetone extractables.

A 50 gram portion of the dry resultant rubber was dissolved in hexane to form a uniform solution. One part per hundred rubber (by weight) of Santoflex 134 antioxidant was added and kneaded into the solution. The solvent was then removed by vacuum drying.

The resultant dry and stabilized rubber was further evaluated by compounding it based on the standard natural rubber recipe as described above, with the exception that only 48 parts N339 carbon black were added per 100 parts rubber to account for the 2 parts carbon black previously added. The dried rubber product is identified in Table 6, below, as Sample 8A, and compared to commercially available *Hevea* rubber, identified as *Hevea* #1.

TABLE 6

| Micro Dumbbell Tensile @23 C. | Sample 8A | Hevea #1 |
|---|---|---|
| Max Stress (MPA) | 29.8 | 31.5 |
| 100% (MPA) | 3.4 | 3.3 |
| 200% (MPA) | 10.0 | 10.2 |
| 300% (MPA) | 17.8 | 19.6 |
| Brk Strain % | 472 | 448.9 |
| Toughness | 63.2 | 61.6 |

| Micro Dumbbell Tensile @100 C. | Sample 8A | Hevea #1 |
|---|---|---|
| Max Stress (MPA) | 15.3 | 21.8 |
| 100% (MPA) | 2.4 | 2.6 |
| 200% (MPA) | 5.9 | 6.5 |
| 300% (MPA) | 10.1 | 11.7 |
| Brk Strain % | 565 | 513.6 |
| Toughness | 50.3 | 51.4 |

From the data in Table 6, it is observed that the rubber product obtained in Example 8 compares very favorably in performance to commercially available *Hevea* natural rubber.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

We claim:

1. A process for recovering rubber from an aqueous non-Hevea natural rubber latex that contains natural rubber, water, extractables, and one or more additives, and is essentially free of lignocellulosic plant material, comprising the steps of:
   contacting the latex with a separating solvent composition comprising at least one hydrocarbon solvent in an amount of 5% to 60% by weight and at least one organic polar solvent in an amount of 40 to 95% by weight whereby at least 75% of the natural rubber is separated from the water and a solution having a viscous rubber phase containing natural rubber and a reduced amount of extractables is formed;
   isolating the viscous rubber phase; and
   drying the viscous rubber phase to create a resultant natural rubber
   wherein the resultant natural rubber has an amount of acetone extractables of 5% by weight or less.

2. A process as claimed in claim 1 further comprising, prior to drying the viscous rubber phase, the step of contacting the viscous rubber phase with at least one extracting solvent composition, wherein said at least one extracting solvent composition comprises at least one organic polar solvent.

3. A process as claimed in claim 2 wherein the amount of acetone extractables in the resultant natural rubber is 1% by weight or less.

4. A process as claimed in claim 3 wherein said at least one extracting solvent composition comprises acetone.

5. A process as claimed in claim 2 wherein, in said separating solvent composition, said at least one hydrocarbon solvent is present in an amount between 5% and 25% by weight and said at least one organic polar solvent is present in an amount between 75% and 95% by weight, said at least one extracting solvent composition comprises acetone, and the amount of acetone extractables in the resultant natural rubber is 1% by weight or less.

6. A process as claimed in claim 1 wherein the at least one organic polar solvent is selected from the group consisting of alcohols having from 1 to 8 carbon atoms, ketones having from 3 to 8 carbon atoms, and combinations thereof.

7. A process as claimed in claim 1 wherein the at least one organic polar solvent is selected from the group consisting of ethanol, isopropanol, methanol, acetone, methyl ethyl ketone, and combinations thereof.

8. A process as claimed in claim 1 wherein the at least one hydrocarbon solvent is selected from the group consisting of alkanes having from 4 to 9 carbon atoms, cycloalkanes having from 5 to 10 carbon atoms, aromatics or alkyl substituted aromatics having from 6 to 12 carbon atoms, and combinations thereof.

9. A process as claimed in claim 1 wherein the at least one hydrocarbon solvent is selected from the group consisting of heptanes, nonane, pentane, hexane, cyclohexane, cyclopentane, benzene, xylene, toluene, and combinations thereof.

10. A process as claimed in claim 1 wherein the weight ratio of separating solvent composition to latex is 100:1 to 1:1.

11. A process as claimed in claim 1 wherein the weight ratio of separating solvent composition to latex is 20:1 to 1:1.

12. A process as claimed in claim 2 wherein the at least one organic polar solvent of the at least one extracting solvent composition is selected from the group consisting of alcohols having from 1 to 8 carbon atoms, ketones having from 3 to 8 carbon atoms, and combinations thereof.

13. A process as claimed in claim 2 wherein the at least one organic polar solvent of the at least one extracting solvent composition is selected from the group consisting of ethanol, isopropanol, methanol, acetone, methyl ethyl ketone, and combinations thereof.

14. A process for recovering rubber from an aqueous non-Hevea natural rubber latex that contains natural rubber, water, extractables, and one or more additives, and is essentially free of lignocellulosic plant material, comprising the steps of:
   contacting the latex with a separating solvent composition comprising hexane or cyclohexane in an amount of 5% to 60% by weight and acetone in an amount of 40 to 95% by weight whereby at least 75% of the natural rubber is separated from the water and a solution having a viscous rubber phase containing natural rubber and a reduced amount of extractables is formed;
   isolating the viscous rubber phase; and
   drying the viscous rubber phase to create a resultant natural rubber
   wherein the resultant natural rubber has an amount of acetone extractables of 5% by weight or less.

15. A process for recovering rubber from an aqueous non-Hevea natural rubber latex that contains natural rubber, water, extractables, and one or more additives, and is essentially free of lignocellulosic plant material, comprising the steps of:
   contacting the latex with a separating solvent composition comprising at least one hydrocarbon solvent in an amount of 5% to 60% by weight and at least one organic polar solvent in an amount of 40% to 95% by weight whereby at least 75% of the natural rubber is separated from the water and a solution having a viscous rubber phase containing natural rubber and a reduced amount of extractables is formed, wherein the weight ratio of separating solvent composition to latex is 100:1 to 1:1;
   isolating the viscous rubber phase;
   contacting the viscous rubber phase with at least one extracting solvent composition, wherein said at least one extracting solvent composition comprises at least one organic polar solvent; and
   drying the viscous rubber phase to create a resultant natural rubber
   wherein the resultant natural rubber has an amount of acetone extractables of 5% by weight or less.

16. A process as claimed in claim 15 wherein the at least one organic polar solvent of the separating solvent composition and of the at least one extracting solvent composition is selected from the group consisting of alcohols having from 1 to 8 carbon atoms, ketones having from 3 to 8 carbon atoms, and combinations thereof; and wherein the at least one hydrocarbon solvent is selected from the group consisting of alkanes having from 4 to 9 carbon atoms, cycloalkanes having from 5 to 10 carbon atoms, aromatics or alkyl substituted aromatics having from 6 to 12 carbon atoms, and combinations thereof.

17. A process as claimed in claim 16 wherein the at least one hydrocarbon solvent is cyclohexane or hexane and the at least one organic polar solvent of the separating solvent composition and of the at least one extracting solvent composition is acetone.

18. A process as claimed in claim 15 wherein the weight ratio of separating solvent composition to latex is 20:1 to 1:1.

19. A process as claimed in claim 15 wherein the amount of acetone extractables in the resultant natural rubber is 1% by weight or less.

* * * * *